United States Patent [19]

Tarumi et al.

[11] Patent Number: 4,488,160
[45] Date of Patent: Dec. 11, 1984

[54] ELECTROSTATIC APPARATUS

[75] Inventors: Noriyoshi Tarumi, Hachioji; Haruo Iwahashi, Fussa; Masahiko Matsunawa; Hiroshi Tokunaga, both of Hachioji, all of Japan

[73] Assignee: Konishiroku Photo Industry Co., Ltd., Tokyo, Japan

[21] Appl. No.: 325,852

[22] Filed: Nov. 30, 1981

[30] Foreign Application Priority Data

Dec. 12, 1980 [JP] Japan .................................. 55-174629
Dec. 12, 1980 [JP] Japan ........................... 55-177531[U]

[51] Int. Cl.³ ............................................ G01D 15/06
[52] U.S. Cl. ..................................... 346/154; 346/159
[58] Field of Search ....................... 346/154, 155, 159; 358/300

[56] References Cited

U.S. PATENT DOCUMENTS 3,689,935 9/1972 Pressman et al. .................... 346/159
4,054,885 10/1977 Rothgordt ........................... 346/154

Primary Examiner—Thomas H. Tarcza
Attorney, Agent, or Firm—Jordan B. Bierman

[57] ABSTRACT

An electrostatic reproducing apparatus comprising a charged particle modulating electrode unit, wherein the common electrode and the control electrode are divided into a plurality of the groups, respectively, in the direction in which the particle passing apertures are arranged. Each of thus divided common electrode groups is disposed in a staggered manner with respect to the corresponding control electrode groups, and the same electric potential is applied to two adjacent common electrode groups opposed to that control electrode group through which a charged particle is to be modulated. The control electrode groups are disposed in such a manner that a boundary between two adjacent common electrode groups is aligned with the center line of the opposed control electrode group. At least one of the surfaces of said charged particle modulating electrode unit is provided with a solid state scanning system of wiring formed integrally therewith.

3 Claims, 8 Drawing Figures

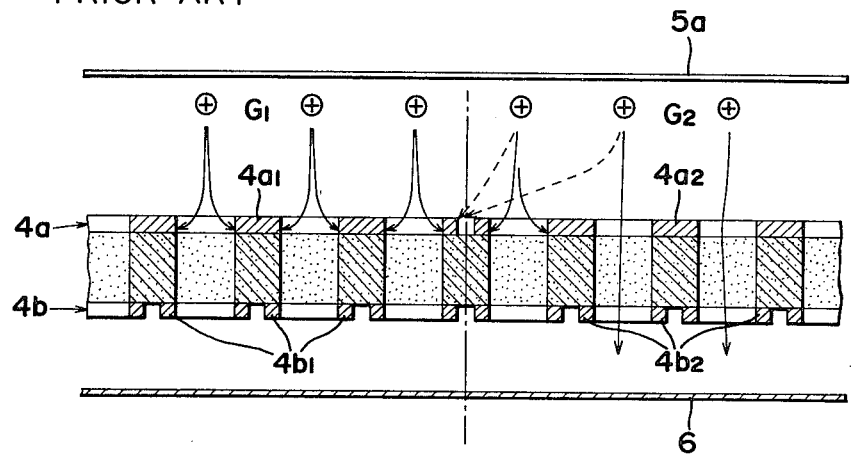
PRIOR ART FIG. 3
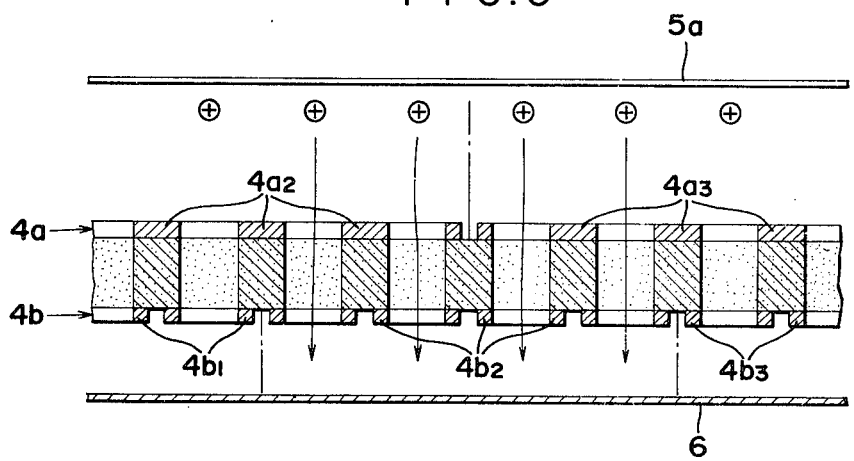
FIG. 5

ELECTROSTATIC APPARATUS

BACKGROUND OF THE INVENTION

1. Field of the Invention

This invention relates to an electrostatic reproducing apparatus for electrostatically reproducing an image of an original by solid-state scanning using a charged particle modulating electrode (including an ion modulating electrode) unit, and an electrostatic reproducing apparatus having a solid state scanning system of wiring formed on a substrate for a charged particle modulating electrode unit.

2. Description of the Prior Art

An electrostatic reproducing apparatus is one of several apparatuses for reproducing on recording paper an image signal of information supplied from a computer, information transmitted through a communication line, or information obtained by converting an image of an original into an electric signal by a solid state image sensor, such as a CCD (charged coupled device image sensor). Various types of electrostatic reproducing apparatuses have been proposed. In an electrostatic reproducing apparatus an image signal is formed on a charge receptor, such as a photosensitive material, or a dielectric or an electrostatic recording paper. There is an electrostatic reproducing apparatus of such type that an electrostatic latent image is formed on a dielectric by using an ion modulating electrode unit, a kind of electrostatic latent image-forming means, which is adapted to modulate in accordance with image signals the corona ions generated by a corona wire. FIG. 1 is a schematic diagram illustrating the construction of an example of the above-mentioned type of electrostatic reproducing apparatus. In this apparatus, an image signal obtained by subjecting an image of an original to photoelectric conversion by a solid state image sensor, such as a CCD, or a signal representative of electric information from a computer or a communication line, is supplied to a signal processing circuit 1, and the resulting signal is then sent to an ion modulating electrode unit actuating or drive circuit 2. Reference numeral 3 denotes a control circuit including a clock generator for making the extraction timing of signals from the signal processing circuit 1 and actuating circuit 2. An ion modulating electrode unit 4 consists of a common electrode 4a which is a continuous layer of a conductive material and a control electrode 4b which is a segmented layer of a conductive material, which are formed on the opposite surfaces of an insulating layer, and has a single row of, or a plurality of rows of ion passing apertures 4c, through which control electrode 4b is adapted to receive an image signal from the actuating circuit 2. A corona ion generator 5 containing a corona wire 5a therein is disposed above the ion modulating electrode unit 4, and a rotary drum 6 consisting of a dielectric thereunder. A developing unit 7, a transfer electrode 8, a separating pawl 9, a charge eliminating electrode 10 and a developer cleaning blade 11, which are necessary for carrying out a conventional electrophotographic process, are disposed around the rotary dielectric drum 6, and a fixing unit 12 is disposed on the downstream side of the rotary drum 6. The rate of passage of ions, which are generated by the corona ion generator 5, through the ion passing apertures 4c is modulated with a control signal applied to the control electrode 4b of the ion modulating electrode unit 4. Thus, an electrostatic latent image corresponding to the image information to be reproduced is formed on the dielectric constituting the rotary drum 6. The electrostatic latent image thus formed is developed with a developer in the developing unit 7 to be then transferred by the transfer electrode 8 to recording paper P. The recording paper P is then separated from the rotary dielectric drum 6 with a separating pawl 9 to be fixed by the fixing unit 12 and ejected outside of the apparatus.

The ion modulating electrode unit used in the above electrostatic reproducing apparatus is provided with a single row of, or a plurality of rows of, ion passing apertures 4c, and a rate of passage of ions through the apertures 4c is modulated with voltages applied to the common electrode 4a and control electrode 4b. Accordingly, the control electrode 4b consists of segmented electrode members which are independent of each other, each of the independent electrode members having one of the ion passing apertures 4c, each of the independent electrode members being adapted to receive an image signal from the actuating circuit 2. The number of the ion passing apertures 4c is, for example, as large as 5–15/mm, so that the number of electric lead lines extended to the control electrode members corresponding to the ion passing apertures 4c becomes enormously large. In order to increase the resolution of the reproducing apparatus, it is necessary that the number of the ion passing apertures 4c be increased. Consequently, the number of the electric lead lines extended to the control electrode members becomes increasingly large. Then, as shown in FIG. 2, all ion passing apertures and all corresponding control electrode members are divided into a plurality (for example 15–16) of groups G1-Gn, and the same image signal is applied simultaneously to the control electrode members as common wire in the corresponding positions in each of the groups G1-Gn (for example, a control electrode member $Ce1$ in a minor electrode unit $4b1$ in the group G1, a control electrode member $Ce2$ in a minor electrode unit $4b2$ in the group G2, . . . a control electrode member $Cen$ in a minor electrode unit $4bn$ in the group Gn), the group being modulated with a voltage applied to minor common electrode units $4a1, 4a2 \ldots 4an$. This allows the number of electric lead lines extended to the control electrode members to be reduced. (In this structure, the common electrode 4a is disposed facing to the corona ion generator 5 as shown in FIG. 1). This control system is known as a group control system or a solid state scanning system. The group control system, which consists of a switching circuit constituting a drive circuit for supplying an image signal to the control electrode, a hold circuit, and a shift register, is advantageous in that it has small dimensions and capacity.

However, in an electrostatic reproducing apparatus employing the above-described group control system, the dividing positions of minor common electrode units $4a1, 4a2 \ldots 4an$ in the groups G1, G2 . . . Gn and those of the minor control electrode units $4b1, 4b2 \ldots 4bn$ in the same groups are in agreement with one another, so that the density of an image becomes uneven in the boundary portions of these minor electrode units. This problem will be described with reference to FIG. 3. FIG. 3 is a schematic representation of that portion of a divided ion modulating electrode unit which is in the vicinity of a boundary between two groups G1, G2. In this example, the passage of ion flow (positive ions) is blocked in the group G1, and passed in the group G2, by voltages applied to the minor common electrode units 4a1, 4a2. In a group control system using such positive ions, an electric potential of the minor common electrode unit 4a2 which passes the passage of an ion flow is higher than that of the minor common electrode unit 4a1 which blocks the passage of an ion flow. Accordingly, a part of the positive ions generated by a corona wire 5a in a region of the group G2 tends to advance as shown in broken line toward the minor common electrode unit 4a1 having a lower electric potential. The same phenomenon occurs in some cases in boundary portions (not shown) of groups G2, G3. Therefore, the ion flow passing through the ion passing apertures 4c in the boundary portion of each group is decreased to cause the amount of charge held on a charge receptor to be decreased. As a result, the density of those portions of a reproduced image which correspond to the boundary portions of the groups is decreased. This would cause the density of a reproduced image as a whole to become uneven.

In a conventional electrostatic reproducing apparatus, in which the electrostatic reproduction of an image of an original is carried out by using an ion modulating electrode unit and on the basis of the above-mentioned group control system, a group control system of wiring is provided separately from the ion modulating electrode unit and connected thereto with electric wires and connectors. Accordingly, such an electrostatic reproducing apparatus requires very complicated assembling and wiring operations. This causes the efficiency of manufacturing the apparatus to be decreased. In such an electrostatic reproducing apparatus, the resolution thereof cannot be improved to a great extent due to the complicated construction thereof. In another type of electrostatic reproducing apparatus using a multi-stylus electrode, the above-mentioned problem has been solved by combining the multi-stylus electrode and a group control system of wiring together on a single substrate by using through-hole wiring. However, in the ion modulating electrode unit, which consists of, as mentioned above, electrodes of a conductive material and an insulating layer sandwiched between the electrodes, it is difficult as in the multi-stylus electrode to combine the group control system of wiring and the ion modulating electrode members together due to the problems of electrode material and chemical etching technique.

SUMMARY OF THE INVENTION

An object of the present invention is to obtain an electrostatic reproducing apparatus comprising a charged particle modulating electrode (including an ion modulating electrode) unit having a common electrode and a control electrode, each of which is divided into a plurality of groups in the direction in which charged particle passing apertures are arranged, in such a manner that each of the common electrode groups is staggered with respect to the corresponding control electrode group, the same electric potential being applied to two adjacent common electrode groups corresponding to such control electrode groups that are to pass the passage of a charged particle flow.

Another object of the present invention is to obtain an electrostatic reproducing apparatus comprising a solid state scanning system of wiring, and an ion modulating electrode unit which are combined together on a single substrate by using such as a chemical etching technique.

The above and other objects as well as the advantageous features of the invention will become apparent from the following description of the preferred embodiment taken in conjunction with the accompanying drawings.

BRIEF DESCRIPTION OF THE DRAWINGS

FIG. 3 illustrates the operation of a conventional ion modulating electrode unit;

FIG. 5 illustrates an operation of the ion modulating electrode unit employed in the apparatus according to the present invention;

FIG. 7 is an enlarged view of a portion B of the wiring pattern shown in FIG. 6a.

DESCRIPTION OF THE PREFERRED EMBODIMENTS

Figure 1:
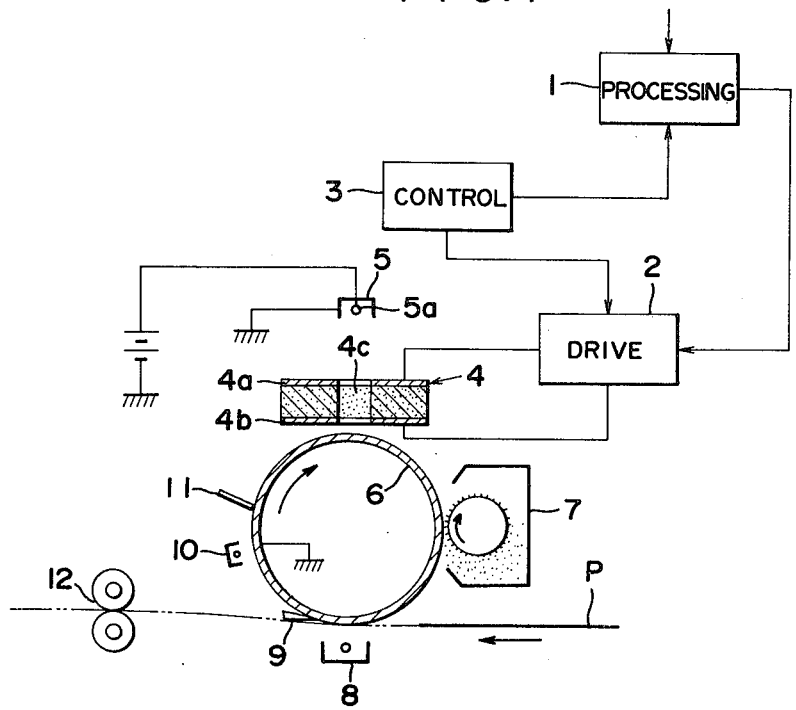
FIG. 1 is a schematic diagram illustrating the construction of a conventional electrostatic reproducing apparatus using an ion modulating electrode unit.
Figure 2:
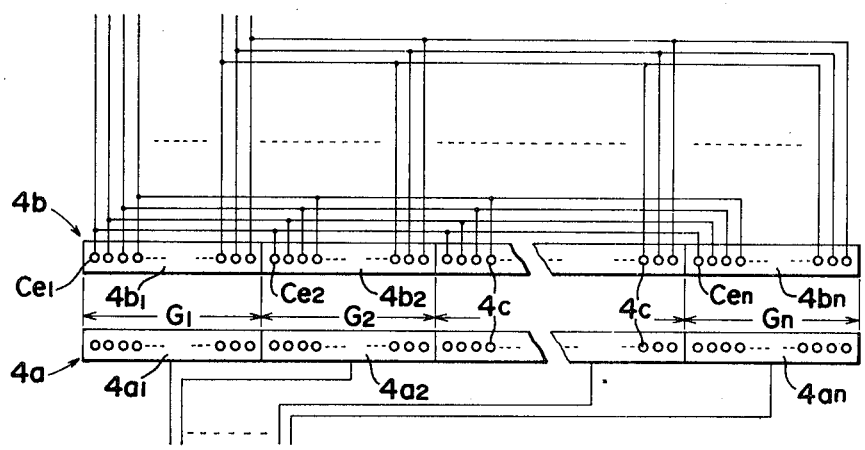
FIG. 2 is a schematic diagram illustrating the construction of a conventional ion modulating electrode unit.
Figure 4:
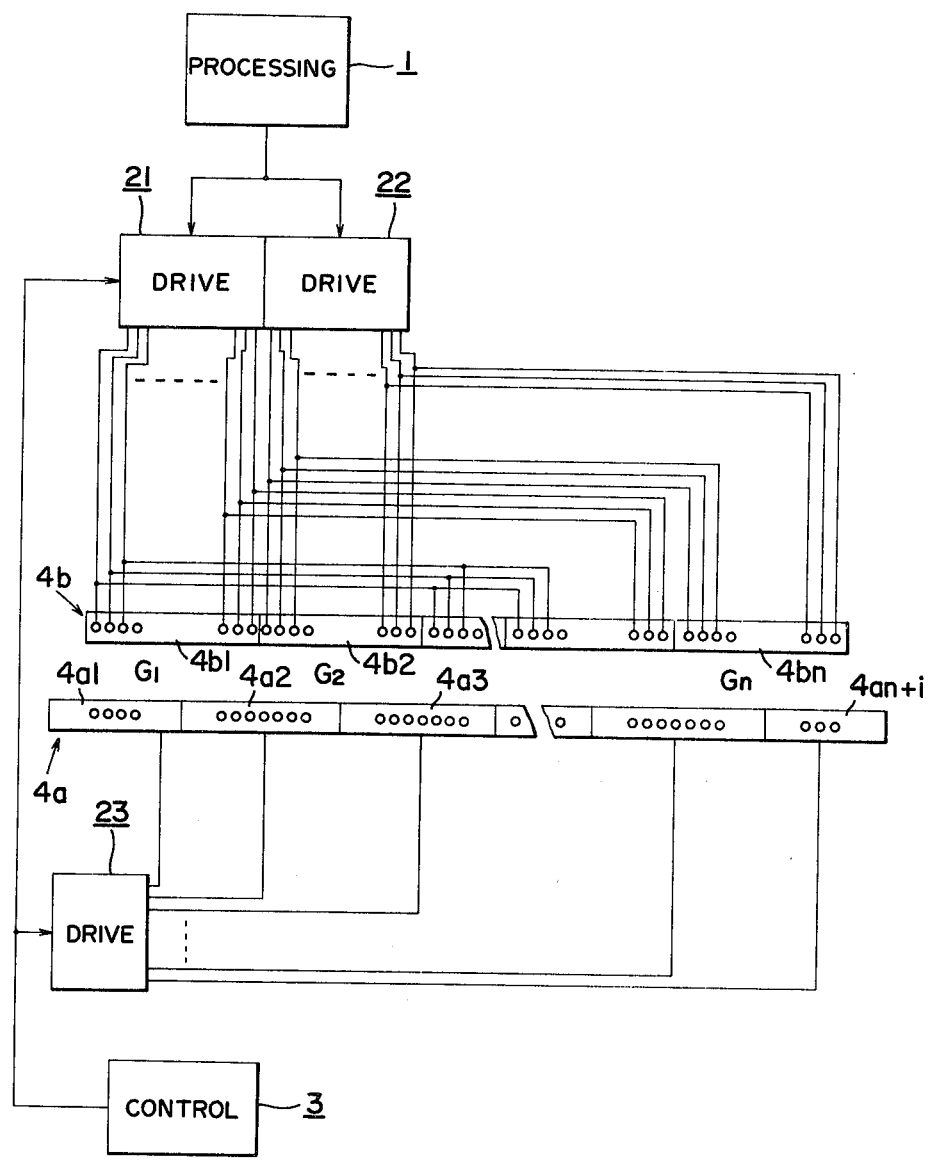
FIG. 4 is a schematic diagram illustrating the construction of an ion modulating electrode unit employed in an electrostatic reproducing apparatus according to the present invention.

FIG. 4 shows the arrangement of electrode members of a charged particle modulating electrode (including an ion modulating electrode) unit used in an electrostatic reproducing apparatus according to the present invention. A control electrode 4b is divided into n groups, and a common electrode 4a into n+1 groups. The electrode groups of these electrodes 4a, 4b are so arranged that a boundary between two adjacent common electrode groups, for example, 4a1 and 4a2 is aligned with the center of an opposed control electrode group, for example, 4b2. A drive circuit for the control electrode 4b consists of a drive circuit member 21 for actuating the control electrode groups 4b1, 4b3, 4b5 . . . and a drive circuit member 22 for actuating the control electrode groups 4b2, 4b4, 4b6 . . . . These drive circuit members 21, 22 are adapted to receive an image signal from a signal processing circuit 1 (refer to FIG. 1), and a synchronizing signal from a control circuit 3. This synchronizing signal is also applied to a drive circuit 23 for the common electrode 4a.

The application of signals to and the operation of the ion modulating electrode unit having the above-described construction will be described.

In order to pass positive ions through the control electrode group 4b2 alone in FIG. 4, a high electric potential is applied to the common electrode groups 4a2, 4a3, and an electric potential lower than that of the control electrode corresponding to image signal to the other common electrode groups. As a result, ions (positive ions) advancing to the control electrode group 4b2 pass through ion-passing apertures in boundary portions thereof as shown in FIG. 5 without turning aside at these regions, as well as ion-passing apertures in an intermediate portion thereof. In this case, however, the ions tend to enhance ion-passing apertures in control electrode groups 4b1, 4b3 as well, which are on both sides of the control electrode groups 4b2. Therefore, an electric potential for blocking the passage of ions is applied from the drive circuit 21 to these control electrode groups 4b1, 4b3. Further, the ion flow passing through the ion passing apertures can be controled by applying an electric potential corresponding to the image signal on the control electrode. The electric potential to be applied on the common electrode can also be determined with respect to the range of electric potential applied on the control electrode.

When electric potentials are applied to the electrode groups in the above-mentioned manner, a rate of passage of ions in the control electrode group 4b2 becomes uniform, so that the concentration of the ion becomes uniform. In order to pass ion flow through the control electrode group 4b3, a high electric potential is applied to the common electrode groups 4a3, 4a4 and a low electric potential to the other common electrode groups. When the common electrode groups are scanned in order in the above-described manner, an electrostatic latent image in accordance with an image signal is formed on a charge receptor.

According to the present invention described above, the common electrode and control electrode in the charged particle modulating electrode (including an ion modulating electrode) unit are divided into a plurality of groups, respectively, in the direction in which charged particle passing apertures are arranged, and each of the divided common electrode groups is disposed in a staggered manner with respect to the corresponding control electrode groups, with the same electric potential applied to two adjacent common electrode groups opposed to the control electrode group through which a charged particle is to be passed. Thus, the rate of passage of charged particles through each of the control electrode groups becomes uniform, so that the concentration of the charged particles becomes uniform. Needless to say, the electrostatic reproducing apparatus according to the present invention has advantages based on the group control system. The embodiment described above employs ions as charged particles. Charged ink mist can be used, of course, as the charged particles.

Figure 6A:
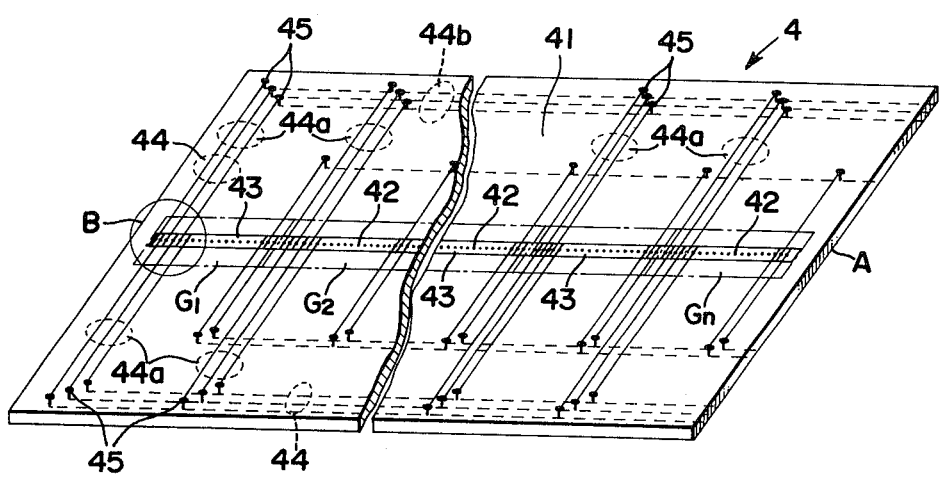
FIG. 6a is a perspective view of a wiring pattern formed on the upper surface of the ion modulating electrode unit used in the present invention.
Figure 6B:
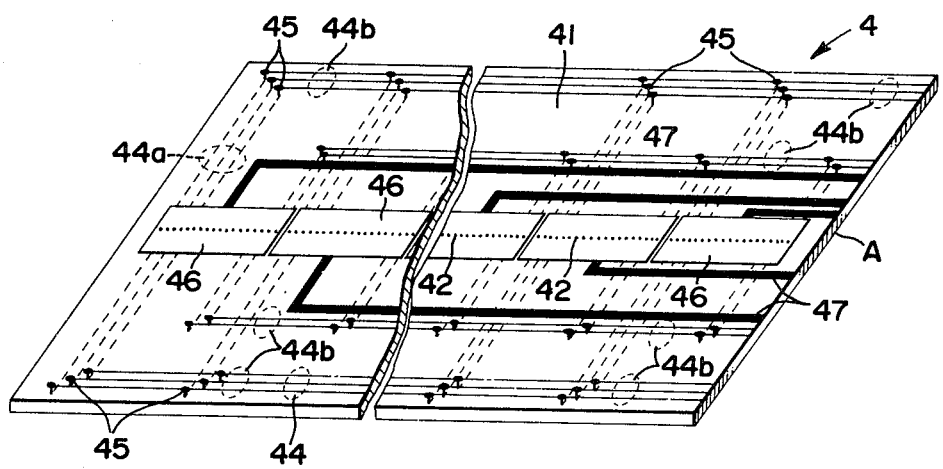
FIG. 6b is a perspective view of a wiring pattern formed on the lower surface of the ion modulating electrode unit used in the present invention.
Figure 7:
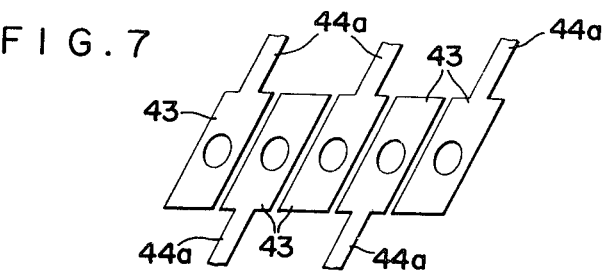

FIGS. 6a and 6b are perspective views of a charged particle modulating electrode (including ion modulating electrode) unit employed in the electrostatic reproducing apparatus according to the present invention. In an electrode unit 4, ion-passing apertures 42 are formed in a row in the central portion of a flexible printed circuit board 41. As shown in FIG. 6a, a control electrode 43 is provided corresponding to the ion-passing apertures 42, and electric lead lines 44 connected to the control electrode 43 are formed on the upper and lower surfaces of the printed circuit board 41 so as to be extended to one edge (right-hand edge A in the drawing) thereof. In the electric lead lines 44, electric lead lines 44a formed on the upper surface of the printed circuit board 41 and electric lead lines 44b formed on the lower surface thereof are electrically connected together in conductive sections 45 formed through the printed circuit board. FIG. 7 is an enlarged view of a part of the control electrode 43 and parts of the electric lead lines 44 connected thereto, which are enclosed with a circle B in FIG. 6.

The electrode unit 4 is further provided on the lower surface thereof with common electrode groups 46 which are independent of one another. Electric lead lines 47 connected to these common electrode groups 46 are also extended to the edge A of the printed circuit board 41. An ordinary connector is fitted around the edge A of the printed circuit board 41 to electrically connect the electric lead lines to the externally provided drive circuit (designated by a reference numeral 2 in FIG. 1). In the embodiment described above, ions are used as charged particles, which may be substituted by charged ink mist or charged toner particles.

A process for manufacturing the charged particle modulating electrode (including an ion modulating electrode) unit of the above-described construction will now be described.

Thin conductive members are pasted on both surfaces of a flexible insulating sheet material of, for example, a polyimide resin or a polyester resin to form an printed circuit board 41. Through holes are made by drill in accordance with the patterns of electric lead lines 44 connected to a control electrode in those portions of the printed circuit board 41 in which conductive sections 45 for electrically connecting upper electric lead lines 44a and lower electric lead lines 44b together are to be formed. Chemical plating of copper is coated on those portions of the printed circuit board which are around the through apertures, to electrically connect the upper and lower surfaces of the printed circuit board together. The upper and lower surfaces of the printed circuit board 41 are subjected separately to etching treatment in accordance with the patterns of electric lead lines to be formed thereon. Thus, electric lead lines are formed on both surfaces of the printed circuit board 41. Finally, particle passing apertures 42 are formed by an etching process in predetermined portions of the printed circuit board. An electrode unit having a wiring pattern as shown in FIGS. 6a and 6b is formed in this manner. The above is a mere example of a process for manufacturing a charged particle modulating electrode (including ion moduating electrode) unit, and the order of the steps therein may be changed.

In the embodiment described above, a solid state scanning system of wiring and a charged particle modulating electrode (including an ion modulating electrode) unit are formed in a combined state on a single printed circuit board by using an etching technique. This allows a circuit structure to be formed compactly, and the manufacturing cost to be reduced greatly. The present invention also allows the density of a charged particle modulating electrode (including ion modulating electrode) unit to be increased to a great extent. Moreover, the apparatus according to the present invention permits using shorter electric lead lines as compared with conventional apparatuses of this kind. Accordingly, the capacitance of the electrodes can be reduced effectively, and an image signal switching speed can be increased.

While the described embodiments represent the preferred forms of the invention, it is to be understood that modifications will occur to those skilled in the art without departing from the spirit of the invention. The scope of the invention is therefore to be determined solely by the appended claims.

What is claimed is:

1. In an electrostatic reproducing apparatus comprising a charged particle modulating electrode unit consisting of an insulating layer, a common electrode and a control electrode sandwiching said insulating layer therebetween, and a plurality of charged particle passing apertures formed through said electrodes and said insulating layer, the improvement comprising forming said common electrode and said control electrode into a plurality of divided groups, respectively, in the direction in which said particle passing apertures are arranged, with each of the thus divided common electrode groups being disposed in a staggered manner with respect to the corresponding control electrode groups, and means applying the same electric potential to two adjacent common electrode groups opposed to that controlled electrode group through which a charged particle is to be modulated.

2. In an electrostatic reproducing apparatus according to claim 1, in which said improvement comprises disposing said common electrode groups and said control electrode groups in such a manner that a boundary between two adjacent common electrode groups is aligned with the center line of the opposed control electrode group.

3. In an electrostatic reproducing apparatus according to claim 1 in which said improvement includes the combination with a solid state scanning system of wiring formed integrally with the surface of one of said electrodes.

* * * * *